Dec. 14, 1948.  S. MARKELL  2,456,293
SEMIRIMLESS OPHTHALMIC MOUNTING
Filed Jan. 23, 1947
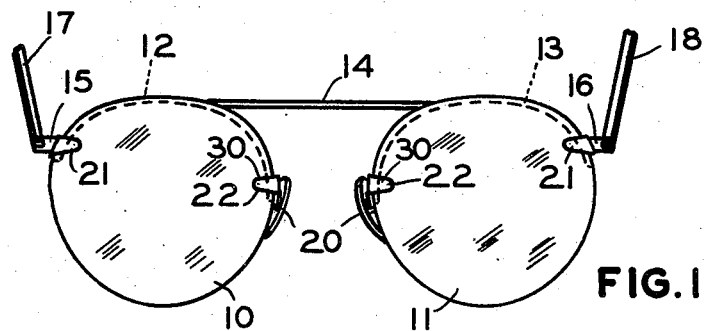
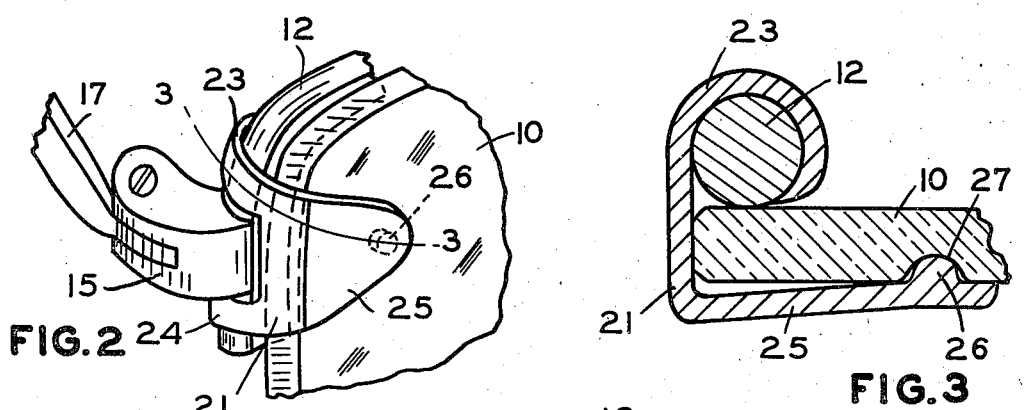
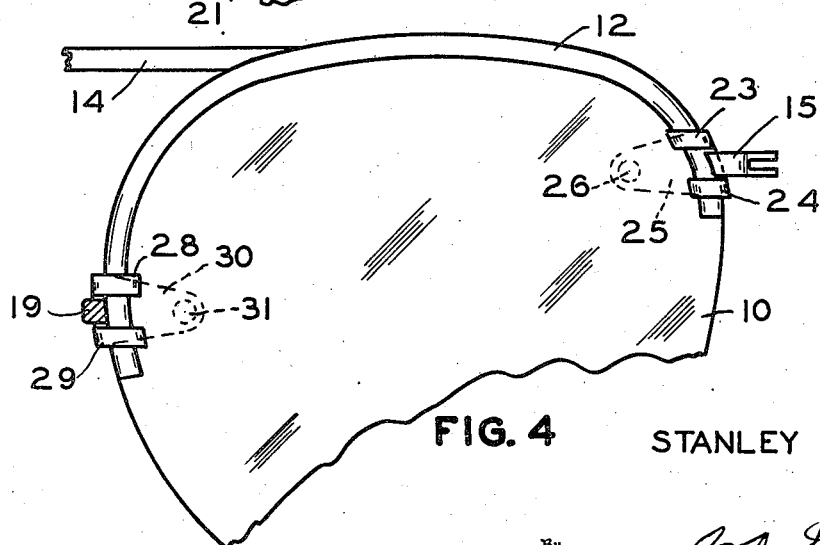
STANLEY MARKELL
Inventor Patented Dec. 14, 1948

2,456,293

UNITED STATES PATENT OFFICE 2,456,293

SEMIRIMLESS OPHTHALMIC MOUNTING

Stanley Markell, Rochester, N. Y., assignor to Bausch & Lomb Optical Company, Rochester, N. Y., a corporation of New York Application January 23, 1947, Serial No. 723,677

1 Claim. (Cl. 88—41)

This invention relates to ophthalmic mountings and more particularly it has reference to mountings of the semi-rimless type wherein frame members extend along the nasal, top, and temporal portions of the rear surfaces of the lenses.

One of the objects of this invention is to provide an improved ophthalmic mounting of the type described. A further object is to provide improved means for detachably securing lenses to a mounting of this type. Still another object is to provide a mounting of the type described in which the lenses are attached by means which eliminates the use of apertures extending through the lenses. Further objects and advantages reside in certain novel features of construction, arrangement, and combination of parts as will hereinafter be more fully described and pointed out in the appended claim.

Referring to the drawings:

Fig. 1 is a front elevation of an ophthalmic mounting embodying my invention, the temples being broken away.

Fig. 2 is an enlarged fragmentary perspective view showing the lens holding means.

Fig. 3 is a sectional view taken on line 3—3 of Fig. 2.

Fig. 4 is an enlarged rear view showing one lens and a part of the mounting.

A preferred embodiment of my invention is illustrated in the drawings wherein 10 and 11 indicate a pair of lenses which are secured to a mounting comprising the frame members 12 and 13 connected by a bridge 14. The frame members 12 and 13 engage, respectively, the rear surfaces of lenses 10 and 11 and extend along the nasal, upper, and temporal portions thereof. Secured, respectively, to the temporal portions of the frame members 12 and 13 are the endpieces 15 and 16 which pivotally support the usual temples 17 and 18. Rearwardly extending pad arms 19 are secured to the nasal portions of the frame members 12 and 13 and support the usual nose pads 20.

The lenses 10 and 11 are detachably held on the mounting by the resilient clips 21 and 22 which are mounted, respectively, on the temporal and nasal portions of the frame members. The clips 21 have spaced fingers 23 and 24 which extend rearwardly and are bent around the frame member 12 with the fingers 23 and 24 positioned, respectively, on the upper and lower sides of the endpiece 15. The clips 21 have portions 25 which overlie the front surface of the lens and carry, on their inner surfaces, the protuberances 26 which are seated in depressions 27 formed on the front surfaces of the lenses. Similarly, clips 22 have spaced fingers 28 and 29 which extend around the nasal portion of frame member 12 with the fingers positioned, respectively, above and below the pad arms 19. The clips 22 have the portions 30 which overlie the front surfaces of the lenses and also carry the inwardly projecting protuberances 31 which extend into depressions, not shown, formed in the front surfaces of the lenses adjacent the nasal edges of the lenses.

It will be apparent, therefore, that the lenses may be readily secured to the mounting by sliding them upwardly, as shown in Fig. 1, so that the clips overlie the front surfaces of the lenses to permit the protuberances carried by the clips to snap into the depressions formed on the front surfaces of the lenses. It will be understood, of course, that the clips 21 and 22 are formed of resilient material so that the protuberances are held in the depressions by the resilience of the clips. The rear surfaces of the lenses will, of course, be forced into engagement with the frame members 12 and 13 so that the lenses will be securely held. The lenses may be readily removed by merely raising the clips so as to disengage the protuberances from the depressions in the lenses and permit the lenses to be slid downwardly from the mounting. Since the clips are resilient, it is possible to readily accommodate lenses of different thicknesses. Since the clips are secured to the frame members by the spaced fingers which are bent around the members, the former may be readily replaced by means of a plier or other suitable tool. Repairs are, therefore, facilitated and new clips can be attached in order to accommodate lenses of extreme thicknesses.

From the foregoing, it will be apparent that I am able to attain the objects of my invention and provide an improved type of semi-rimless mounting wherein the lenses may be detachably secured without the use of tools. Since it is not necessary to drill holes through the lenses for the reception of screws or the like, lens breakage is reduced to a minimum. In my construction the lenses are firmly, yet detachably, secured to the mounting through the resilience of the clip members and not by the resilience of the frame members. Various modifications may obviously be made without departing from the spirit of my invention as pointed out in the appended claim.

I claim:

In an ophthalmic mounting the combination of a lens, a frame member positioned against the rear surface of the lens and extending along the nasal, top, and temporal portions thereof, said lens having depressions on its front surface adjacent its nasal and temporal edges, a mounting part secured to and extending laterally from each of the nasal and temporal portions of the frame member, and means for detachably holding the lens on the member comprising resilient clips mounted, respectively, on the nasal and temporal portions of the member, each clip overlying the front surface of the lens and having a protuberance positioned in the adjacent depression, the protuberances being held in the depressions by the resilience of the clips, each clip having a pair of spaced integral fingers positioned, respectively, above and below the adjacent mounting part, said fingers extending partially around the frame member for holding the clip thereto.

STANLEY MARKELL.

REFERENCES CITED

The following references are of record in the file of this patent:

UNITED STATES PATENTS

| Number | Name | Date |
|---|---|---|
| 2,240,725 | Styll | May 6, 1941 |
| 2,241,894 | Vitolo | May 13, 1941 |
| 2,257,812 | Pomeranz | Oct. 7, 1941 |
| 2,301,328 | Rochte | Nov. 10, 1942 |